United States Patent [19]

Yoshioka et al.

[11] Patent Number: 5,096,278
[45] Date of Patent: Mar. 17, 1992

[54] REFLECTIVE SCREEN FOR FRONT-PROJECTION TELEVISION

[76] Inventors: Takayuki Yoshioka; Toru Yokoo, both c/o Pioneer Electronic Corporation, Omori Works, No. 15-5, Omori Nishi 4-chome, Ota-ku, Tokyo, Japan

[21] Appl. No.: 614,136

[22] Filed: Nov. 16, 1990

[30] Foreign Application Priority Data

Jun. 25, 1990 [JP] Japan .................. 2-164027

[51] Int. Cl.⁵ .............................. G03B 21/60
[52] U.S. Cl. .................................... 359/459
[58] Field of Search .................. 350/127–129

[56] References Cited

U.S. PATENT DOCUMENTS

| | | | |
|---|---|---|---|
| 2,362,573 | 11/1944 | MacNeille | 350/129 |
| 2,991,693 | 7/1961 | MacNeille | 350/129 |
| 3,191,495 | 6/1965 | Miller | 350/129 |
| 3,365,350 | 1/1968 | Cahn | 350/129 |
| 3,704,055 | 11/1972 | Hong | 350/128 X |
| 4,232,939 | 11/1980 | Kikuchi | 350/129 |
| 4,298,246 | 11/1981 | Iwamura | 350/128 X |
| 4,606,609 | 8/1986 | Hong | 350/128 |
| 4,767,186 | 8/1988 | Bradley, Jr. et al. | 350/128 |
| 4,911,529 | 3/1990 | Van de Ven | 350/129 X |

*Primary Examiner*—Richard A. Wintercorn

[57] ABSTRACT

The front surface of a lens plate is worked into lenticules extending in the vertical direction. A reflective material is provided in the rear of the lens plate. Black stripes are vertically formed on the back surface of the lens plate such that their pitch is increased from the center toward the right and left edges of the screen so that incident light emitted from CRTs or a liquid crystal projector and reflected light from the reflective material pass between the black stripes.

11 Claims, 2 Drawing Sheets

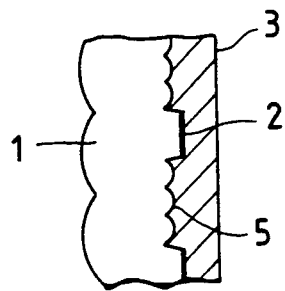
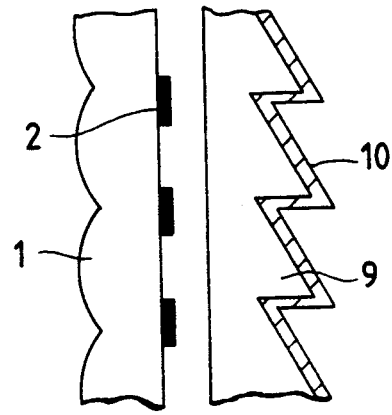
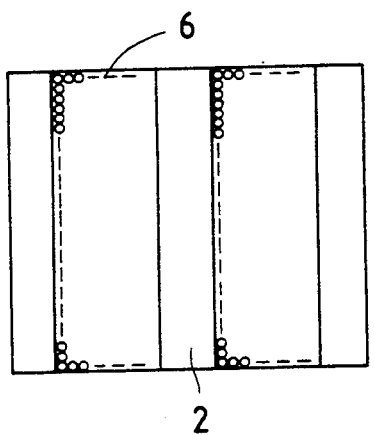
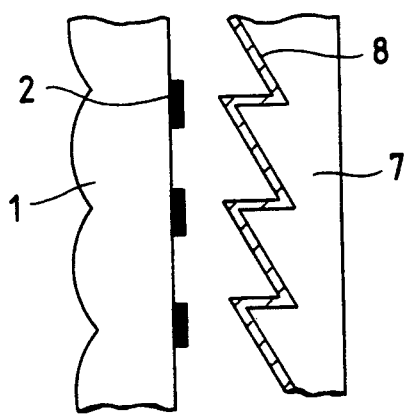
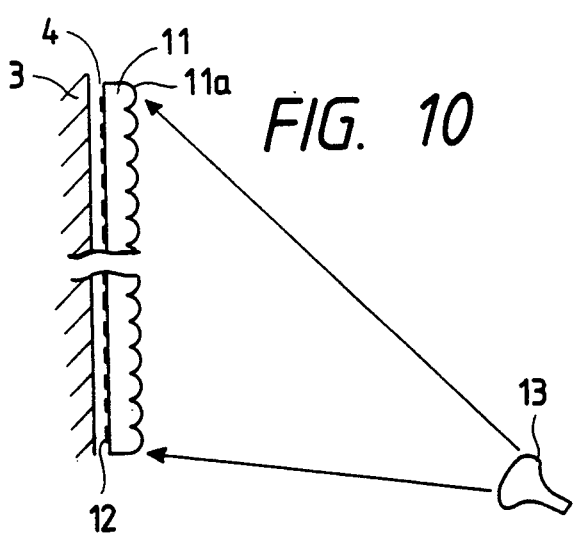

REFLECTIVE SCREEN FOR FRONT-PROJECTION TELEVISION

BACKGROUND OF THE INVENTION

The present invention relates to a reflective screen for use in a front-projection television, in which picture images reproduced on CRTs or a liquid crystal projector, which is placed on the front side of said screen, are projected onto the screen.

Conventional reflective screens for the front-projection television include a mat screen, a screen having an aluminum film reflection surface, and a Fresnel lens screen.

In the mat screen, the diffusion characteristic of reflection light in the vertical and horizontal directions is improved by such measures as making uneven the surface of a cotton cloth or plastic sheet, or sticking small beads to the surface of such a material.

In the aluminum screen, the diffusion characteristic of reflection light is enhanced by forming a highly reflective aluminum film on a back-reinforced plastics (base material) by, e.g., vapor deposition or sticking, and further processing the aluminum film to have minute convexes.

In the Fresnel lens screen, the front surface or back surface of a lens plate is formed into a Fresnel lens surface, and a reflection film is provided on the back side of the lens plate. This type of screen has a large screen gain without occurrence of hot spots, and a wide viewable range.

However, it is inevitable in the above screens for the front-projection television that the screen reflects not only incident light from the CRTs (LC projector) but also ambient light, in accordance with its reflectivity. This causes the screen to become brighter in proportion to the intensity of ambient light, i.e., the brightness of a room. Therefore, it may result that a dark portion of a picture image cannot be seen well because its brightness on the screen become comparable with that of ambient light. In other words, it is difficult in a bright room to obtain sufficient performance of contrast.

SUMMARY OF THE INVENTION

The present invention has been made in consideration of the above problems of the prior art, and paying attention to the fact that the light from CRTs or a liquid crystal projector is incident on position of a screen at a particular angle while ambient light is incident on the screen at every angle. An object of the invention is to provide a reflective screen for use in a front-projection television which has a contrast higher than that of prior art screens within a viewable range.

According to the present invention, a reflective screen for use in a front-projection television in which said screen receives incident light emitted from projection means such as CRTs and a liquid crystal projector, comprises:

a lens plate having, at its front side, a first lenticular surface which includes a plurality of first lenticules extending in a first direction and arranged in a second direction which is perpendicular to said first direction;

a reflective material provided in the rear of said lens plate; and black stripes formed on the back surface of said lens plate so as to extend in said first direction and to be arranged in said second direction.

In order to attain the above object of the invention more effectively, the pitch of the black stripes may be varied so that the incident light and reflected light from the reflective material pass between the black stripes.

BRIEF DESCRIPTION OF THE DRAWINGS

FIGS. 3 through 6 are horizontal sectional views showing reflective screens according to second to fifth embodiments of the invention, respectively;

FIG. 7 is a rear view of a lens plate of a reflective screen according to a sixth embodiment of the invention;

FIGS. 8 and 9 are horizontal sectional views showing reflective screens according to seventh and eighth embodiments of the invention; and FIG. 10 is a vertical sectional view showing a reflective screen according to a ninth embodiment of the invention.

DETAILED DESCRIPTION OF THE PREFERRED EMBODIMENTS

Figure 1:
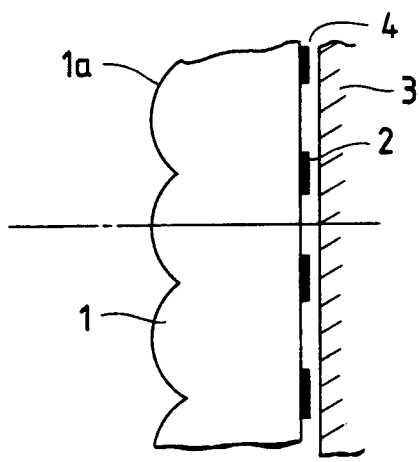
FIG. 1 is a horizontal sectional view showing a reflective screen according to a first embodiment of the present invention.
Figure 2:
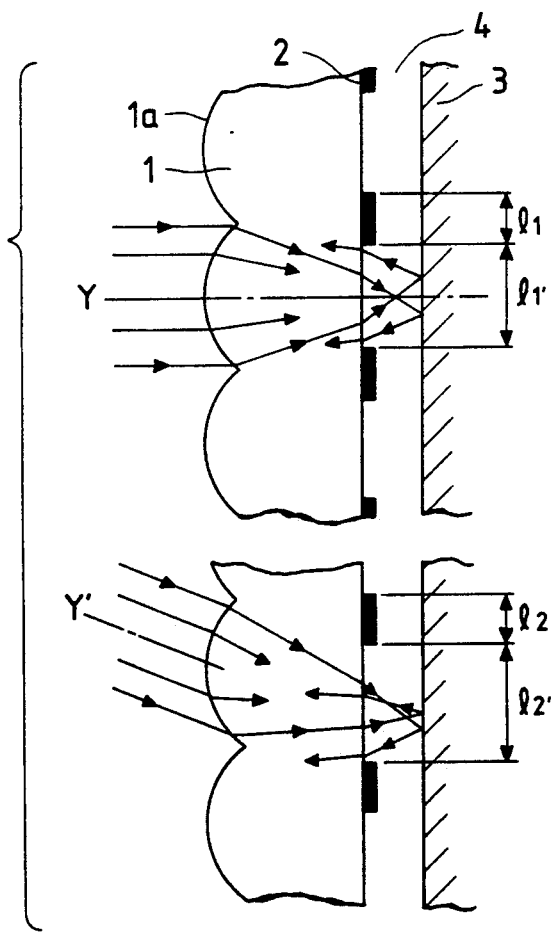
FIG. 2 is a horizontal sectional view illustrating positions at which black stripes are formed.

A reflective screen according to a first embodiment of the present invention will be described with reference to horizontal cross-sectional views of FIGS. 1 and 2.

The screen according to the first embodiment includes a lens plate 1 having a lenticular surface 1a which receives incident light from CRTs or a liquid crystal projector. A reflective material 3 is placed on the back side of the lens plate 1 through a space 4.

While at the center portion of the screen a light beam Y from the CRTs (LC projector) is incident on the screen perpendicularly, at peripheral portions a light beam $Y_1$ is incident on the screen obliquely. Positions of black stripes 2 provided on the back surface of the lens plate 1 are determined considering this variation of the incident angle of the light beam from the CRTs. That is, the pitch of the black stripes 2 is increased toward the periphery so that an incident light beam focused by each lenticule (unit surface) and a reflected light beam from the reflective material 3 pass between the adjacent pair of black stripes 2, as shown in FIG. 2.

More specifically, since the width of each black stripe 2 is usually kept constant in the entire screen, i.e., $l_1 = l_2$, the interval of the adjacent black stripes 2 is increased toward the periphery, i.e., $l_1' < l_2'$.

By virtue of the above arrangement of the black stripes 2, almost all the incident light beam is reflected by the reflective material 3, and then diffused by the lenticular surface 1a. Therefore, almost all the incident light beam is reflected and output from the screen.

On the other hand, although ambient light, whose intensity depends on the brightness of a room, is incident on the screen at every angle, i.e., at angles covering almost all the range of from 0° to 180°, only part of the incident ambient light having a particular incident angle (which depends on its incident position) selectively passes between the black stripes 2 and is reflected by the reflective material 3. The remaining part of the incident ambient light reaches the black stripe 3 and is absorbed thereby.

Therefore, it is understood that a brightness component on the screen due to ambient light is reduced and, as a result, the contrast performance of the screen is improved, which contributes to the provision of clear, legible pictures on the screen.

Figure 3:
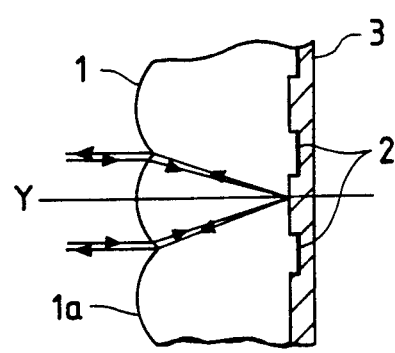

In the first embodiment described above, the space 4 is provided between the lens plate 1 and the reflective material 3. However, depending upon the relationship between the focal length and thickness of the lens plate 1, the reflective material 3 may be directly formed on the back surface of the lens plate 1 by, e.g., vapor deposition as in a second embodiment shown in FIG. 3. The screen of FIG. 3 can present the advantages similar to those of the first embodiment.

Figure 4:
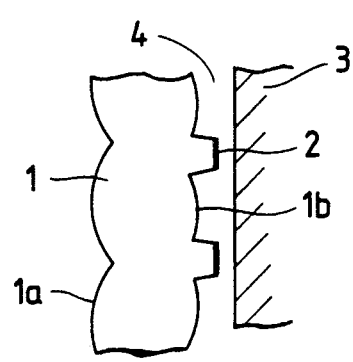
Figure 5:
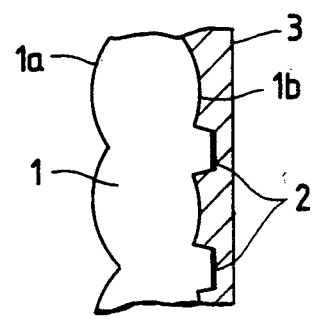

FIGS. 4 and 5 show third and fourth embodiments in which the back surface of the lens plate 1 of the first and second embodiments is also worked into a lenticular surface 1b, respectively. In these third and fourth embodiments, the widths $l_1$ and $l_2$ and intervals $l_1'$ and $l_2'$ are designed in the same manner as was described above in connection with the first embodiment. The screen according to the third and fourth embodiments provides a wider viewable range because the lenticular surface 1b further diffuses a light beam reflected from the reflective material 2.

The similar advantages can be obtained by fifth and sixth embodiments shown in FIGS. 6 and 7, respectively. In the fifth embodiment of FIG. 6, the back surface of the lens plate 1 is worked into small cylindrical surfaces 5. In the sixth embodiment of FIG. 7, the same surface is worked into microlens surfaces 6. The sixth embodiment has an additional advantage of a wider viewable range in the vertical direction.

FIG. 8 shows a seventh embodiment of the invention. In this embodiment, the front surface of a base material 7 is worked into a Fresnel lens surface which has a sawtooth structure arranged in the form of concentric circles, and a reflective material 8 is formed on such a Fresnel surface by, e.g., vapor deposition of aluminum. This embodiment presents advantages of a large screen gain without generation of hot spots, and a wider viewable angle.

FIG. 9 shows an eighth embodiment which is different from the seventh embodiment only in that the back surface of a transparent base material 9 is worked into the Fresnel lens surface and a reflective material 10 is formed on the Fresnel lens surface. Having also the Fresnel-lens type reflective surface, this embodiment presents the same advantages as the seventh embodiment of FIG. 8. Further, it is noted that the base material 9 may be in close contact with the lens plate 1 and the black stripes 2.

The above description is devoted to the case in which both the lenticules and the black stripes extending in the vertical direction are arranged in the horizontal direction. However, the invention is not limited to such a case, but both the lenticules and the black stripes extending in the horizontal direction may be arranged in the vertical direction. In this latter case, the pitch of the black stripes is varied so that the incident light beam and the reflected light beam from the reflective material pass between the black stripes, which is the essential concept of the invention for arranging the black stripes.

FIG. 10 is a vertical cross-sectional view showing a reflective screen according to a ninth embodiment of the invention. The ninth embodiment is different from the first embodiment of FIGS. 1 and 2 in that a lens plate 11 has a lenticular surface 11a consisting of lenticules extending in the horizontal direction and arranged in the vertical direction. Since the reflective screen is placed above CRTs 13, the pitch of black stripes 12, which are also arranged in the vertical direction, is increased from the bottom toward the top of the screen. A reflective material 3 is provided in the rear of the lens plate 11 through a space 4.

What is claimed is:

1. A reflective screen for use in a front-projection television in which said screen receives incident light emitted from projection means such as CRTs and a liquid crystal projector, comprising:
   a lens plate having, at its front side, a first lenticular surface which includes a plurality of first lenticules extending in a first direction and arranged in a second direction which is perpendicular to said first direction;
   a reflective material provided in the rear of said lens plate; and
   black stripes formed on a back surface of said lens plate so as to extend in said first direction and to be arranged in said second direction.

2. The reflective screen according to claim 1, wherein a pitch of said black stripes is varied so that said incident light and reflected light from said reflective material pass between said black stripes.

3. The reflective screen according to claim 2, wherein said first direction is a vertical direction, and said pitch of said black stripes is increased from a center toward right and left edges of said screen.

4. The reflective screen according to claim 2, wherein said first direction is a horizontal direction and said screen is placed above said projection means, and wherein said pitch of said black stripes is increased from a bottom toward a top of said screen.

5. The reflective screen according to claim 2, wherein a width of said black stripes is kept substantially constant, and an interval of said black stripes is varied.

6. The reflective screen according to claim 1, wherein said reflective material is in close contact with said lens plate and said black stripes.

7. The reflective screen according to claim 1, wherein said lens plate has, at its back side, a second lenticular surface which includes a plurality of second lenticules extending in said first direction and arranged in said second direction between said black stripes.

8. The reflective screen according to claim 7, wherein each of said second lenticules includes a plurality of cylindrical surfaces arranged in said second direction.

9. The reflective screen according to claim 1, wherein said lens plate has, at its back side and between said black stripes, a plurality of micro-lens surfaces.

10. The reflective screen according to claim 1, further comprising a base material provided in the rear of said lens plate and having, at its front side, a Fresnel lens surface, wherein said reflective material is formed on said Fresnel lens surface of said base material.

11. The reflective screen according to claim 1, further comprising a transparent base material provided in the rear of said lens plate and having, at its back side, a Fresnel lens surface, wherein said reflective material is formed on said Fresnel lens surface of said base material.

* * * * *

UNITED STATES PATENT AND TRADEMARK OFFICE
CERTIFICATE OF CORRECTION

PATENT NO. : 5,096,278
DATED : March 17, 1992
INVENTOR(S) : Takayuki Yoshioka et al It is certified that error appears in the above-indentified patent and that said Letters Patent is hereby corrected as shown below:

On the title page, item [76] should read --[75] Takayuki Yoshioka;

Toru Yokoo, both of Tokyo, Japan--; and

Title page, item [73], insert --Pioneer Electronic Corporation,

Tokyo, Japan--.

Signed and Sealed this

Fourteenth Day of September, 1993

Attest:

BRUCE LEHMAN

*Attesting Officer*        *Commissioner of Patents and Trademarks*